US008695065B2

(12) United States Patent
Kato et al.

(10) Patent No.: US 8,695,065 B2
(45) Date of Patent: Apr. 8, 2014

(54) DATA COMMUNICATION APPARATUS, DATA COMMUNICATION METHOD, DATA COMMUNICATION PROGRAM, AND STORAGE MEDIUM STORING THE PROGRAM

(75) Inventors: Shinichi Kato, Kawasaki (JP); Osamu Iinuma, Kawasaki (JP); Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/433,614

(22) Filed: Mar. 29, 2012

(65) Prior Publication Data

US 2012/0185923 A1 Jul. 19, 2012

Related U.S. Application Data

(63) Continuation of application No. 11/214,009, filed on Aug. 29, 2005, now Pat. No. 8,171,299.

(30) Foreign Application Priority Data

Aug. 30, 2004 (JP) ................................ 2004-250557

(51) Int. Cl.
*H04L 29/06* (2006.01)
(52) U.S. Cl.
USPC ................ 726/4; 726/14; 358/1.15; 709/200; 709/203; 709/206; 709/224; 235/380; 725/37
(58) Field of Classification Search
USPC .................... 726/14; 709/224, 206, 203, 200; 358/1.15; 707/206; 235/380; 725/37; 705/99
See application file for complete search history.

(56) References Cited

U.S. PATENT DOCUMENTS

| 5,903,723 | A | 5/1999 | Beck et al. |
|---|---|---|---|
| 6,505,237 | B2 | 1/2003 | Beyda et al. |
| 6,867,876 | B1 | 3/2005 | Czyszczewski et al. |
| 6,915,333 | B2 | 7/2005 | Delia et al. |
| 7,249,177 | B1 | 7/2007 | Miller |
| 2002/0016818 | A1 | 2/2002 | Kirani et al. |
| 2002/0129140 | A1 | 9/2002 | Peled et al. |
| 2002/0169714 | A1 | 11/2002 | Ike et al. |

(Continued)

FOREIGN PATENT DOCUMENTS

| JP | 63-146538 A | 6/1988 | |
|---|---|---|---|
| JP | 63146538 | * 6/1988 | .............. H04L 11/20 |

(Continued)

OTHER PUBLICATIONS

Salvatore J. Stolfo, et al.; "Behavior Profiling of Email", Columbia University, New York, NY, Jan. 1, 2003.

*Primary Examiner* — Brandon Hoffman
*Assistant Examiner* — Hee Song
(74) *Attorney, Agent, or Firm* — Rossi, Kimms & McDowell LLP

(57) ABSTRACT

A data communication apparatus which is capable of preventing reception of undesired data by a destination without increasing the load on a network, etc. Data and a destination thereof are input. A sender ID related to a sender who sends the input data is input. The input data is sent to the input destination. A sender ID for data transmission to the input destination is permitted is stored as a permission ID. The input sender ID is collated with the stored permission ID. Whether to permit data transmission is determined according to the collation result.

7 Claims, 10 Drawing Sheets

(56) References Cited

U.S. PATENT DOCUMENTS

| | | |
|---|---|---|
| 2003/0084110 A1 | 5/2003 | Shono |
| 2003/0233418 A1 | 12/2003 | Goldman |
| 2004/0024811 A1* | 2/2004 | Kitada et al. ............. 709/203 |
| 2004/0054904 A1 | 3/2004 | Matsuya |
| 2004/0172429 A1 | 9/2004 | Goguen |
| 2004/0194133 A1* | 9/2004 | Ikeda et al. ............. 725/37 |
| 2005/0002057 A1 | 1/2005 | Oe |
| 2005/0044248 A1 | 2/2005 | Mihira et al. |
| 2005/0067487 A1 | 3/2005 | Brundage et al. |
| 2005/0188026 A1 | 8/2005 | Hilbert et al. |
| 2006/0021013 A1* | 1/2006 | Kinoshita ............. 726/6 |

FOREIGN PATENT DOCUMENTS

| | | |
|---|---|---|
| JP | 11-017862 A | 1/1999 |
| JP | 11-112554 A | 4/1999 |
| JP | 2002-118711 A | 4/2002 |
| JP | 3093432 U | 2/2003 |
| JP | 2004-192118 A | 7/2004 |

* cited by examiner

DATA COMMUNICATION APPARATUS, DATA COMMUNICATION METHOD, DATA COMMUNICATION PROGRAM, AND STORAGE MEDIUM STORING THE PROGRAM

This application is a continuation of U.S. patent application Ser. No. 11/214,009 filed Aug. 29, 2005, which is based on and claims priority from Japanese Patent Application No. 2004-250557, filed Aug. 30, 2004. The disclosure of the priority applications, in their entirety, including drawings, claims and the specification thereof, are hereby incorporated herein by reference.

BACKGROUND OF THE INVENTION

1. Field of the Invention

The present invention relates to a data communication apparatus, a data communication method, a data communication program, and a storage medium storing the program. In particular, the present invention relates to a data communication apparatus and a data communication method that can send input data to an input destination, as well as a data communication program and a storage medium storing the program.

2. Description of the Related Art

Conventionally, a multi-function peripheral (MFP) having a scanner function, a printer function, a network interface, a user interface, a file system, and so forth has been known (see Japanese Laid-Open Patent Publication (Kokai) No. 2002-118711, for example). The MFP is capable of reading image data using the scanner function and sending the image data to a destination designated by using the user interface via a network by Internet facsimile, e-mail attachment, or the like. Also, when a user inputs a division code, an administrator password, and so forth using the user interface, the MFP authenticates the user by means of the input division code, administrator password, and so forth and moves to the ready state.

Also, a MFP has been proposed which authenticates a user by means of a user ID and enables the authenticated user to use an address book for his/her exclusive use in which telephone numbers of facsimile destinations are stored (see Japanese Laid-Open Patent Publication (Kokai) No. H11-017862, for example).

However, in the MFP proposed in Japanese Laid-Open Patent Publication (Kokai) No. H11-017862 mentioned above, when authenticated by means of a user ID, a sender can use an address book for his/her exclusive use in which telephone numbers of facsimile destinations are stored, but image data can be sent to every destination stored in the address book, and hence a recipient receives image data irrespective of whether he/she is willing to receive the image data from the sender.

For this reason, in the above conventional MFP, in the case where the amount of image data sent from the sender is very large, a recipient's network and storage device are overloaded, which may cause a failure to occur in the recipient's network depending on circumstances. Also, since the recipient receives image data irrespective of whether he/she is willing to receive the image data, the load on the recipient's storage device increases as the number of pieces of image data sent increases even if the data amounts are small. Further, there is a possibility that the recipient receives image data totally unrelated to him/her or malicious image data. In the case where image data is attached to an e-mail, the recipient can refer to a sender name, data size, subject, and so forth before receiving the image data attached to the e-mail and thus he/she can prescreen data to be received to some extent, but operations therefor are complicated. Further, since a recipient's mail server (POP server) receives image data attached to an e-mail, the mail server and the network are overloaded.

SUMMARY OF THE INVENTION

It is an object of the present invention to provide a data communication apparatus and a data communication method that are capable of preventing reception of undesired data by a destination without increasing the load on the network, etc., as well as a data communication program and a storage medium storing the program.

To attain the above object, in a first aspect of the present invention, there is provided a data communication apparatus comprising a data input unit that inputs data, a destination input unit that inputs a destination of the data input by the data input unit, a sender ID input unit that inputs a sender ID related to a sender of the data input by the data input unit, a sending unit that sends the data input by the data input unit to the destination input by the destination input unit, a permission ID storage unit that stores a sender ID for which the sending unit is permitted to send data to the destination input by the destination input unit as a permission ID, a collating unit that collates the sender ID input by the sender ID input unit with the permission ID stored in the permission ID storage unit, and a determining unit that determines whether to permit the sending unit to send data according to a result of the collation by the collating unit.

With the arrangement of the first aspect of the present invention, sender IDs of senders who are permitted to send data to respective destinations are stored as permission IDs, an input sender ID is collated with the stored permission IDs, and it is determined whether or not data transmission is to be permitted according to the collation result. As a result, it is possible to provide control such that the sender who has been permitted to send data to the concerned destination is permitted to send data. Therefore, reception of undesired data by a destination can be prevented without increasing the load on a network, etc.

Preferably, the data communication apparatus further comprises a data storage unit that stores the data input by the input unit, and wherein the sending unit is operable when the determining unit determines not to permit the sending unit to send data, to send positional information on the data input by the input data and stored in the data storage unit without sending the data input by the input unit to the destination input by the destination input unit.

More preferably, the positional information comprises information on a path for the data input by the input unit and stored in the data storage unit, and the positional information comprises at least one of a URL, an IP address, a server name, and a folder name.

Preferably, wherein the sending unit sends thumbnail data of the data stored in the data storage unit as well as the positional information on the data stored in the data storage unit to the destination input by the destination input unit.

Preferably, the data communication apparatus comprises a destination storage unit that stores the destination input by the destination input unit, and wherein the permission ID storage unit and the destination storage unit are connected to the data communication apparatus via a network.

Preferably, the data input unit inputs data from any of a scanner, a digital camera, a computer, and a storage device.

Preferably, the destination input unit comprises a destination storage unit that stores a plurality of destinations of data to be sent by the sending unit, and a destination display unit that selectively displays the destinations stored in the destination storage unit.

More preferably, the destination display unit selectively displays at least one destination for which the sender ID input by the sender ID input unit is stored as the permission ID in the permission ID storage unit among the plurality of destinations stored in the destination storage unit.

Preferably, the sender ID input unit inputs the sender ID using a card that stores the sender ID or by biometrics.

Preferably, the sender ID input unit comprises an ID reader that reads and writes information of a noncontact IC tag with the sender ID stored therein.

Preferably, the data communication apparatus further comprises a data amount determining unit that determines whether an amount of the data input by the data input unit is not more than a predetermined value, and wherein even in a case where a sender ID stored as a permission ID in the permission ID storage unit has not been input by the sender ID input unit, the sending unit sends the data input by the data input unit to the destination input by the destination input unit insofar as the amount of the data is not more than the predetermined value.

Preferably, the data communication apparatus further comprises a timing unit that times a present time, and wherein even in a case where a sender ID stored as a permission ID in the permission ID storage unit has not been input by the sender ID input unit, the sending unit sends the data input by the data input unit to the destination input by the destination input unit insofar as the present time is within a predetermined period of time after the result of the collation by the collating unit is obtained.

Preferably, the data communication apparatus further comprises a data transmission level setting unit that sets a data transmission level for the sender ID, and wherein even in a case where a sender ID stored as a permission ID in the permission ID storage unit has not been input by the sender ID input unit, the sending unit sends the data input by the data input unit to the destination input by the destination input unit insofar as the data transmission level is not less than a predetermined value.

Preferably, the data communication apparatus further comprises an image determining device that determines whether predetermined image data is included in the data input by the data input unit, and wherein even in a case where a sender ID stored as a permission ID in the permission ID storage unit has not been input by the sender ID input unit, the sending unit sends the data input by the data input unit to the destination input by the destination input unit depending on a result of the determination by the image determining unit.

Preferably, the data communication apparatus further comprises a keyword determining device that determines whether a predetermined keyword is included in the data input by the data input unit, and wherein even in a case where a sender ID stored as a permission ID in the permission ID storage unit has not been input by the sender ID input unit, the sending unit sends the data input by the data input unit to the destination input by the destination input unit depending on a result of the determination by the keyword determining unit.

Preferably, the data communication apparatus further comprises a characteristic determining device that determines whether predetermined characteristics are included in the data input by the data input unit, and wherein even in a case where a sender ID stored as a permission ID in the permission ID storage unit has not been input by the sender ID input unit, the sending unit sends the data input by the data input unit to the destination input by the destination input unit depending on a result of the determination by the characteristic determining unit.

To attain the above object, in a second aspect of the present invention, there is provided a data communication method executed by a data communication apparatus with a data communicating function, comprising a data input step of inputting data, a destination input step of inputting a destination of the data input in the data input step, a sender ID input step of inputting a sender ID related to a sender of the data input in the data input step, a sending step of sending the data input in the data input step to the destination input in the destination input step, a permission ID storage step of storing a sender ID for which data transmission to the destination input in the destination input step is permitted as a permission ID, a collating step of collating the sender ID input in the sender ID input step with the permission ID stored in the permission ID storage step, and a determining step of determining whether to permit data transmission in the sending unit to send data according to a result of the collation in the collating step.

To attain the above object, in a third aspect of the present invention, there is provided a data communication program executed by a computer, comprising a data input module for inputting data, a destination input module for inputting a destination of the data input by the data input module, a sender ID input module for inputting a sender ID related to a sender of the data input by the data input module, a sending module for sending the data input by the data input module to the destination input by the destination input module, a permission ID storage module for storing a sender ID for which data transmission to the destination input by the destination input module is permitted as a permission ID, a collating module for collating the sender ID input by the sender ID input module with the permission ID stored by the permission ID storage module, and a determining module for determining whether to permit data transmission by the sending module to send data according to a result of the collation by the collating module.

To attain the above object, in a fourth aspect of the present invention, there is provided a computer-readable storage medium that stores the above-discussed data communication program.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
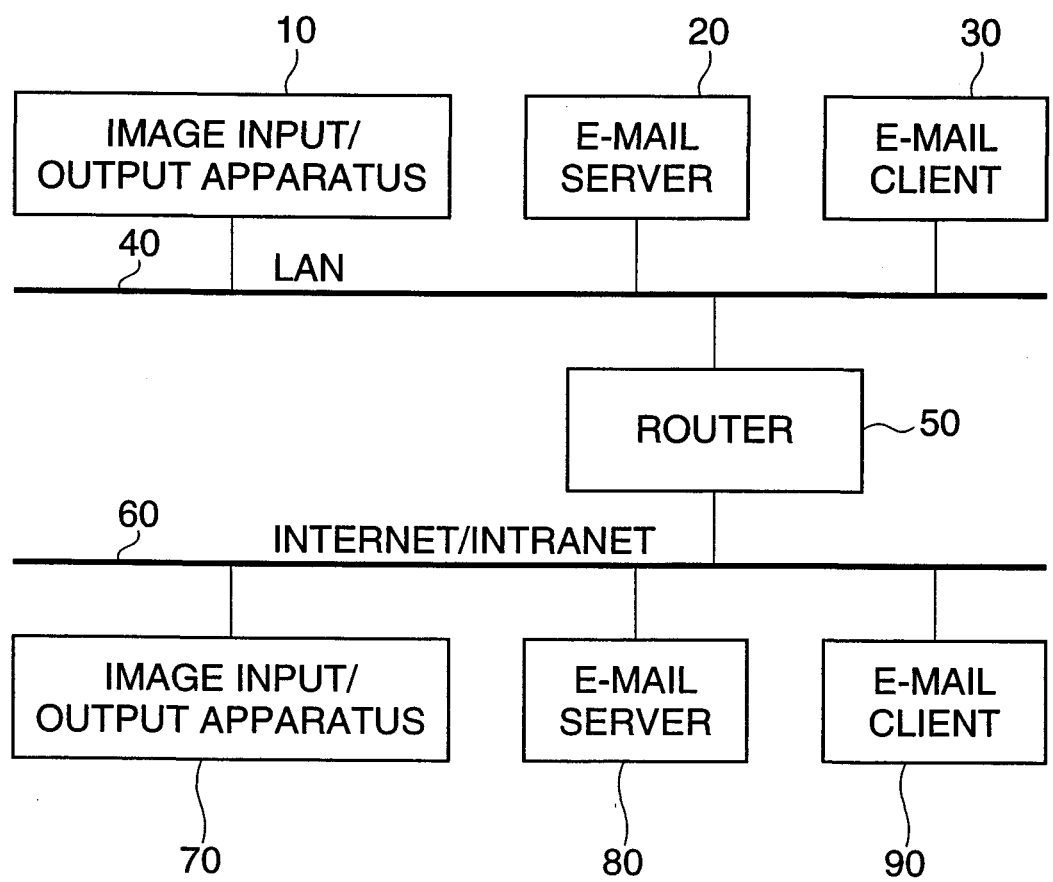
FIG. 1 is a block diagram schematically showing the construction of a network system including data communication apparatuses according to an embodiment of the present invention.

FIG. 1 is a block diagram schematically showing the construction of a network system including data communication apparatuses according to an embodiment of the present invention.

As shown in FIG. 1, the network system is comprised of image input/output apparatuses 10 and 70 as the data communication apparatuses according to the present embodiment, e-mail servers 20 and 80, and e-mail clients 30 and 90.

The image input/output apparatus 10, the e-mail server 20, and the e-mail client 30 are connected to each other via a LAN (Local Area Network) 40. The image input/output apparatus 70, the e-mail server 80, and the e-mail client 90 are connected to each other via the Internet/Intranet 60. The LAN 40 and the Internet/Intranet 60 are connected to each other via a router 50.

The image input/output apparatuses 10 and 70 are each comprised of a scanner section 201 (FIG. 2) as an image input device, and a printer section 202 (FIG. 2) as an image output device. The printer section 202 is capable of printing image data read by the scanner section 201.

The image input/output apparatuses 10 and 70 send image data read by the scanner section 201 to the e-mail servers 20 and 80 or the e-mail clients 30 and 90 via the LAN 40 or the Internet/Intranet 60. Also, the image input/output apparatuses 10 and 70 cause the printer section 202 to print image data received from the e-mail servers 20 and 80 or the e-mail clients 30 and 90 via the LAN 40 or the Internet/Intranet 60.

It should be noted that the image input/output apparatuses 10 and 70 carry out transmission and reception of data by facsimile via a public line 204 (FIG. 2) as well as transmission and reception of data via the LAN 40 or the Internet/Intranet 60.

The e-mail servers 20 and 80 receive image data read by the image input/output apparatuses 10 and 70 as e-mail attachments. The e-mail clients 30 and 90 receive e-mails which the e-mail servers 20 and 80 have received. Also, the e-mail clients 30 and 90 send e-mails to desired e-mail addresses.

In addition to the components shown in FIG. 1, the network system according to the present embodiment may be provided with a database server that is capable of storing and managing image data read by the image input/output devices 10 and 70, a database client that is capable of using the database server, a WWW (World Wide Web) server, and so forth.

Figure 2:
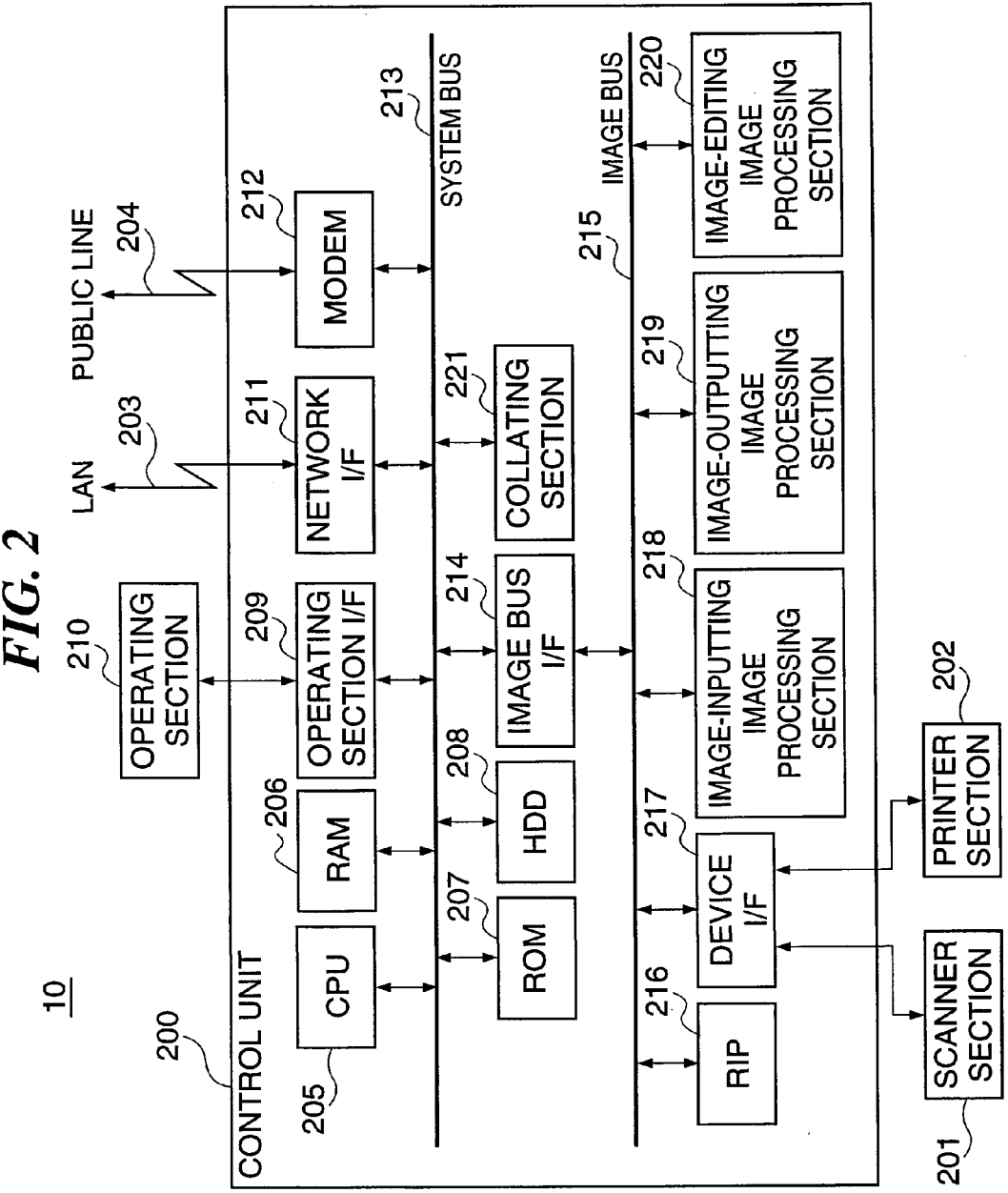
FIG. 2 is a block diagram showing the internal construction of an image input/output apparatus appearing in FIG. 1.

FIG. 2 is a block diagram showing the internal construction of the image input/output apparatus 10 appearing in FIG. 1.

As shown in FIG. 2, the image input/output apparatus 10 is comprised of a control unit 200, the scanner section 201, the printer section 202, and an operating section 210.

The scanner section 201 reads image data from an original and converts the image data into a digital signal. The printer section 202 prints an image based on image data read by the scanner section 201 onto a sheet in full color. The operating section 210 is used by a user to operate the image input/output apparatus 10.

The scanner section 201, the printer section 202, and the operating section 210 are connected to the control unit 200.

The control unit 200 is connected to a LAN 203 and the public line (WAN) 204 as well as the scanner section 201 and the printer section 202, for controlling the input/output of image information and device information.

The control unit 200 is comprised of a CPU 205, a RAM 206, a boot ROM 207, a HDD (Hard Disk Drive) 208, an operating section I/F 209, a network I/F 211, a modem 212, and a collating section 221, which are connected to each other via a system bus 213.

The CPU 205 controls the overall operation of the control unit 200. The RAM 206 is a system work memory used for the CPU 205 to operate, and also serves as an image memory for temporary storing image data. The boot ROM 207 stores a system boot program. The HDD 208 stores system software and image data.

The operating section I/F 209 is connected to the operating section 210, for outputting image data to be displayed in the operating section 210 to the operating section 210 and sending information input by a user through the operating section 210 to the CPU 205. The network I/F 211 such as a LAN card is connected to the LAN 203, for inputting and outputting information. The modem 212 is connected to the public line 204, for inputting and outputting information.

The collating section 221 collates a sender's ID input by the sender who sends image data using the image input/output apparatus 10 through the operating section 210 (hereinafter referred to as "sender ID") with a permission ID, described later. The sender ID is unique to each sender and assigned to each sender in advance. The sender ID is input by the sender.

The control unit 200 is also comprised of a RIP (Raster Image Processor) 216, a device I/F section 217, an image-inputting image processing section 218, an image-outputting image processing section 219, and an image-editing image processing section 220, which are connected to each other via an image bus 215.

The RIP 216 expands PDL (Page Description Language) data into a bitmap image. The device I/F section 217 is connected to the scanner section 201 and the printer section 202, for carrying out synchronous-to-asynchronous conversion of image data. The image-inputting image processing section 218 corrects, processes, or edits image data input by the scanner section 201. The image-outputting image processing section 219 performs image processing such as correction or resolution conversion on image data output from the printer section 202. The image-editing image processing section 220 performs image processing such as rotation or compression/expansion on image data.

The image bus 215 is implemented by a PCI bus or an IEEE 1394 bus, for transferring image data at high speeds.

The system bus 213 and the image bus 215 are connected to each other via an image bus I/F 214 as a bus bridge that converts data structure.

In the case where image data read by the scanner section 201 is distributed using the LAN 203 or the public line 204, the image-inputting image processing section 218 performs predetermined image-inputting image processing on the read image data, and the image-editing image processing section 220 performs suitable image processing according to the destination. Then, the image data on which the above-mentioned image processing has been performed is distributed using the LAN 203 via the network I/F 211, or using the public line 204 via the modem 212.

In the case where image data read by the scanner 201 is copied by the printer section 202, the image-inputting image processing section 218 performs predetermined image-input image processing on the read image data, and the image-editing image processing section 220 performs image processing on the image data. Then, the image-output image processing section 219 decomposes the image data on which the above-mentioned image processing has been performed by the image-edition image processing section 220 into magenta (M), cyan (C), yellow (Y), and black (Bk) components and sends respective density signal values of the generated components to the printer section 202 via the device I/F 217.

Figure 3:
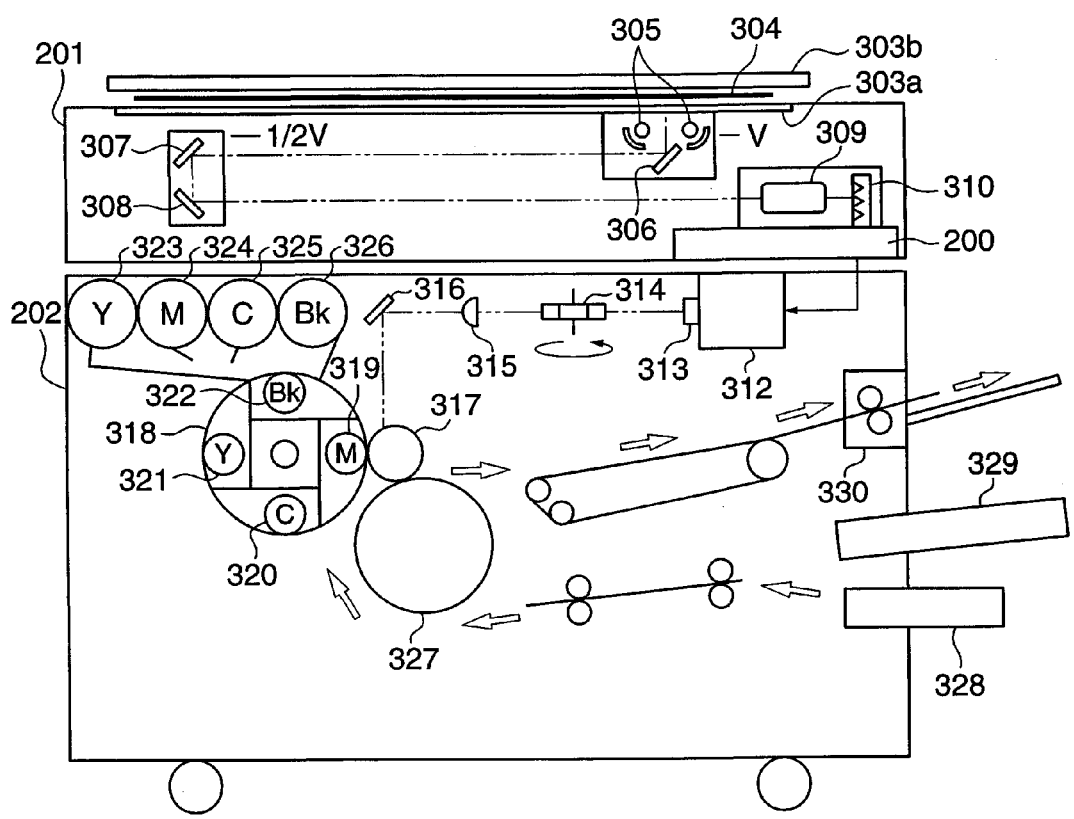
FIG. 3 is a sectional view showing the construction of the image input/output apparatus in FIG. 2.

FIG. 3 is a sectional view showing the construction of the image input/output apparatus 10 appearing in FIG. 2.

Referring to FIG. 3, the image input/output apparatus 10 causes the scanner section 201 to read a color original image as digital data and causes the printer section 202 to generate a copied image.

The scanner section 201 is comprised of an original tray glass 303a, a mirror surface platen 303b, lamps 305, mirrors 306, 307, and 308, a lens 309, and a CCD (solid-state image sensor) 310.

An original 304 is placed on the original tray glass 303a. The mirror surface platen 303b covers the original tray glass 303a. Upon input of a scanning instruction, a copying instruction, or the like from the operating section 210 (FIG. 2), the lamps 305 are energized to illuminate the original 304. The mirrors 306, 307, and 308 guide reflected light from the original 304 to the lens 309. The lens 309 causes the reflected light from the mirror 308 to form an image on the CCD 310.

The CCD 310 of a three-line type outputs the reflected light from the mirror 308 as three image signals consisting of red (R), green (G), and blue (B) image signals constituting full-color information to the control unit 200.

The lamps 305 and the mirror 306 mechanically move at a speed v and the mirrors 307 and 308 mechanically move at a speed ½v in a direction vertical to a line sensor scanning (main scanning) direction so that the entire surface of the original 304 is scanned (sub-scanned). In the example shown in FIG. 3, the scanner section 201 reads the original 304 at a resolution of 600 dpi (dots/inch) in main scanning and sub scanning.

The image-inputting image processing section 218 and the image-editing image processing section 220 perform image processing on the image signals output from the CCD 310. The image-outputting image processing section 219 decomposes the image signals on which the above-mentioned image processing has been performed into magenta (M), cyan (C), yellow (Y), and black (Bk) components to generate respective density signal values of the components. The device I/F 217 sends the respective generated density signal values of the components to the printer section 202. Here, each time the scanner section 201 scans an original once, the density signal value of one of M, C, Y, and Bk components is sent to the printer section 202; therefore, one copy is made by four scans of an original.

The printer section 202 is comprised of a laser driver 312, a semiconductor laser 313, a polygon mirror 314, a f-θ lens 315, a mirror 316, a photosensitive drum 317, and a rotary developing unit 318.

The laser driver 312 drives the semiconductor laser 313 for modulation according to the M, C, Y, and Bk image signals sent from the scanner section 201. The semiconductor laser 313 emits laser light under the control of the laser driver 312. The polygon mirror 314 deflects the laser light emitted from the semiconductor laser 313.

The f-θ lens 315 corrects for a difference in the main scanning speed of the deflected laser light. The mirror 316 irradiates the laser light passed through the f-θ lens 315 onto the photosensitive drum 317. An electrostatic latent image is formed on the photosensitive drum 317 by the laser light irradiated by the mirror 316. The rotary developing unit 318 develops the electrostatic latent image formed on the photosensitive drum 317 with toners. Here, as in reading of the original 304 as mentioned above, the electrostatic latent image is formed at a resolution of 600 dpi in main scanning and sub scanning.

The rotary developing unit 318 is comprised of a magenta developing section 319, a cyan developing section 320, a yellow developing section 321, and a black developing section 322. These four developing sections 319 to 322 alternately come into contact with the photosensitive drum 317 to develop the electrostatic latent image on the photosensitive drum 317 with toners.

The printer section 202 is further comprised of a yellow toner storage section 323, a magenta toner storage section 324, a cyan toner storage section 325, and a black toner storage section 326. These toner storage sections 323 to 326 are provided with toner containers that store respective color toners, and they supply the toners to the respective developing sections 319 to 322.

The printer section 202 is further comprised of sheet cassettes 328 and 329, a transfer drum 327, and a fixing unit 330.

The sheet cassettes 328 and 329 supply sheets to the printer section 202. The transfer drum 327 has wound thereon a sheet supplied from the sheet cassette 328 or 329 to sequentially transfer images of four colors M, C, Y, and Bk developed on the photosensitive drum 317 onto the sheet. The fixing unit 330 fixes toners to the sheet onto which the images have been transferred.

Figure 4:
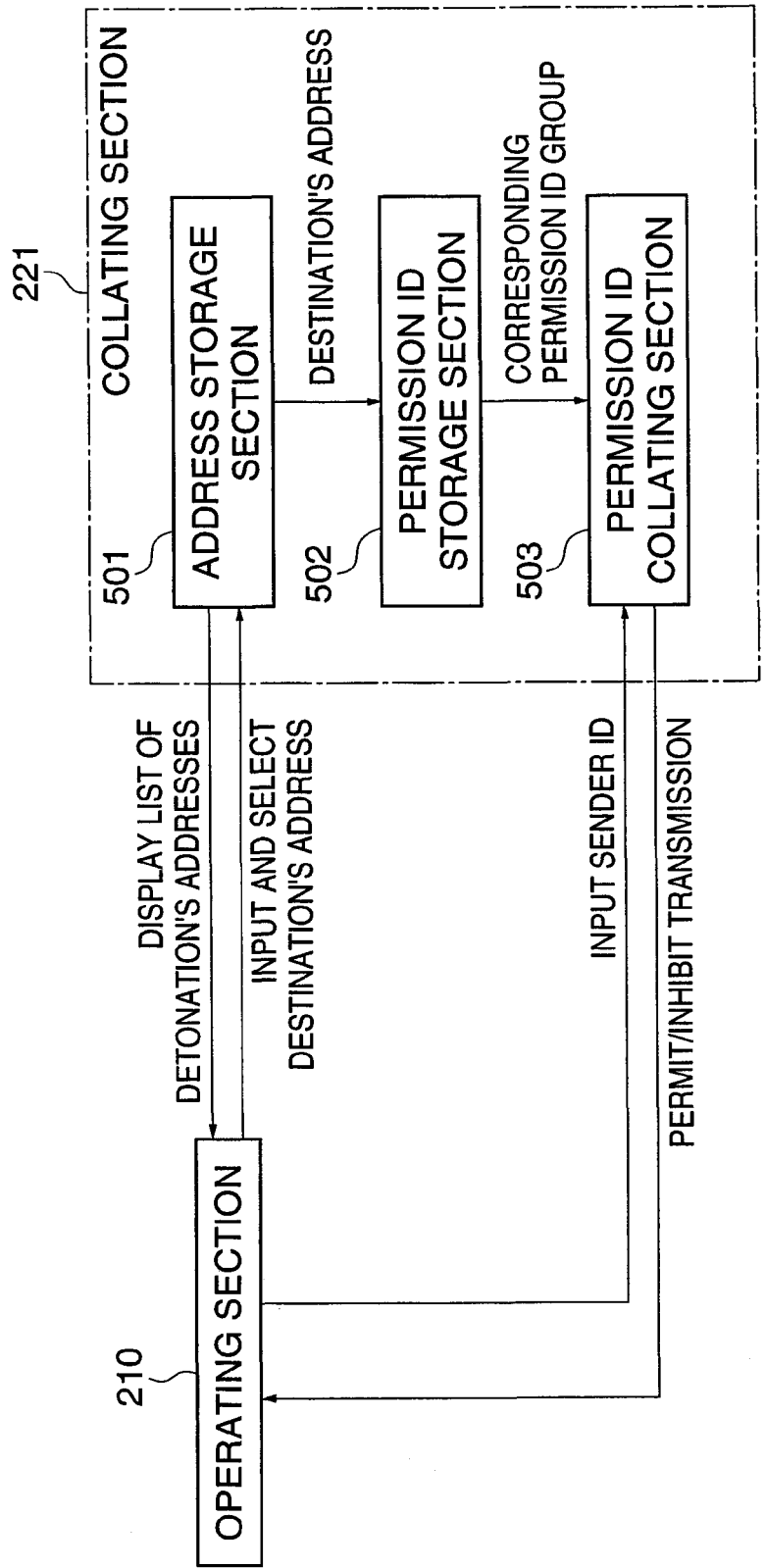
FIG. 4 is a block diagram showing the internal construction of a collating section appearing in FIG. 2.

FIG. 4 is a block diagram showing the internal construction of the collating section 221 appearing in FIG. 2.

As shown in FIG. 4, the collating section 221 is comprised of an address storage section 501, a permission ID storage section 502, and a permission ID collating section 503.

The address storage section 501 stores addresses (e-mail addresses in this example) of image data destinations. The permission ID storage section 502 stores IDs of senders who are permitted to send image data to the addresses stored in the address storage section 501 (hereinafter referred to as "permission IDs") on an address-to-address basis. The permission ID collating section 503 collates a sender ID input by the sender with the permission IDs stored in the permission ID storage section 502.

It may be configured such that the sender inputs a combination of a sender ID and a password, and the input sender ID and password are collated with the permission IDs and passwords corresponding thereto. It should be noted that only the administrator of the image input/output apparatus 10 or operators associated with the respective addresses can store the permission IDs in the permission ID storage section 502 by inputting authentication information such as an ID and a password.

In the case where image data is sent as an e-mail attachment, the sender inputs a sender ID using the operating section 210. The address storage section 501 displays a list of destination's e-mail addresses stored in advance on the display of the operating section 210. The sender who sends the image data selects at least one e-mail address using the operating section 210 from among the destination's e-mail addresses displayed on the display of the operating section 210 or directly inputs at least one e-mail address using the operating section 210. In directly inputting at least one e-mail address, the sender inputs characters such as alphabets and/or symbols one at a time or several at a time (for example, in the case where the operating section 210 is provided with a key for inputting characters "co.jp" or the like at a time). That is, the sender inputs an arbitrary e-mail address by operating the operating section 210 without selecting an e-mail address from the list of e-mail addresses stored in advance in the address storage section 501.

When the destination's e-mail address input (selected from the list or directly input) from the operating section 210 matches an e-mail address stored in advance in the address storage section 501, the address storage section 501 sends the input destination's e-mail address to the permission ID storage section 502. The permission ID storage section 502 sends a group of permission IDs that have been set in association with the e-mail address received from the address storage section 501 to the permission ID collating section 503.

The permission ID collating section 503 compares the sender ID input from the operating section 210 with the permission IDs sent from the permission ID storage section 502. When the input sender ID matches any of the permission IDs sent from the permission ID storage section 502, the permission ID collating section 503 permits the sender to send image data, and on the other hand, when the input sender ID does not match any of the permission IDs sent from the permission ID storage section 502, the permission ID collating section 503 does not permit the sender to send image data.

There are e.g. three methods as described below to register permission IDs in the permission ID storage section 502. It should be noted that in registering an e-mail address in the address storage section 501, an administrator ID and/or a password is set with respect to the e-mail address. Such an administrator ID and/or a password is required to be input in setting permission IDs associated with an e-mail address in the permission ID storage section 502. Therefore, only the administrator or an operator who knows the password (an operator associated with the e-mail address) can perform registration.

In the first method, the scanner section 201 reads a sheet on which an e-mail address, and a permission ID for permitting e-mail transmission to the e-mail address are written, and in response to input of an administrator ID and/or a password set in association with the e-mail address, the e-mail address and the permission ID written on the sheet are character-recognized by a known OCR technique. Then, an e-mail address that matches the e-mail address written on the sheet is searched for from among e-mail addresses stored in the address storage section 501. If an e-mail address that matches the e-mail address written on the sheet is stored in the address storage section 501, a permission ID set in association with the stored e-mail address is searched for from the permission ID storage section 502, and if no set permission ID is found, the permission ID written on the sheet is additionally registered in the permission ID storage section 502. On the other hand, if no e-mail address that matches the e-mail address written on the sheet is stored in the address storage section 501, the e-mail address written on the sheet is additionally registered in the address storage section 501, and the permission ID written in association with the e-mail address is additionally registered in the permission ID storage section 502.

In the second method, an e-mail address and an administrator ID and/or a password are input using the operating section 210 to thereby register the e-mail address in the address storage section 501. At the same time, a permission ID associated with the e-mail address is registered in the permission ID storage section 502. Also, in adding a permission ID to the permission ID storage section 502, an e-mail address associated with the permission ID to be added is called from the address storage section 501 using the operating section 210, and when an administrator ID and/or a password is input to complete authentication, the permission ID can be added to the permission ID storage section 502.

In the third method, an e-mail address for which a permission ID is to be registered in or added to the permission ID storage section 502 is used to send an e-mail in which the permission ID to be registered or added and an administrator ID and/or a password are written from the e-mail client 30, for example, to the image input/output apparatus 10. The image input/output apparatus 10 interprets the e-mail and registers the permission ID written in the e-mail in the permission ID storage section 502. In the third method, registration of a permission ID in the permission ID storage section 502 may be permitted only by sending an e-mail from a specific e-mail address.

Figure 5:
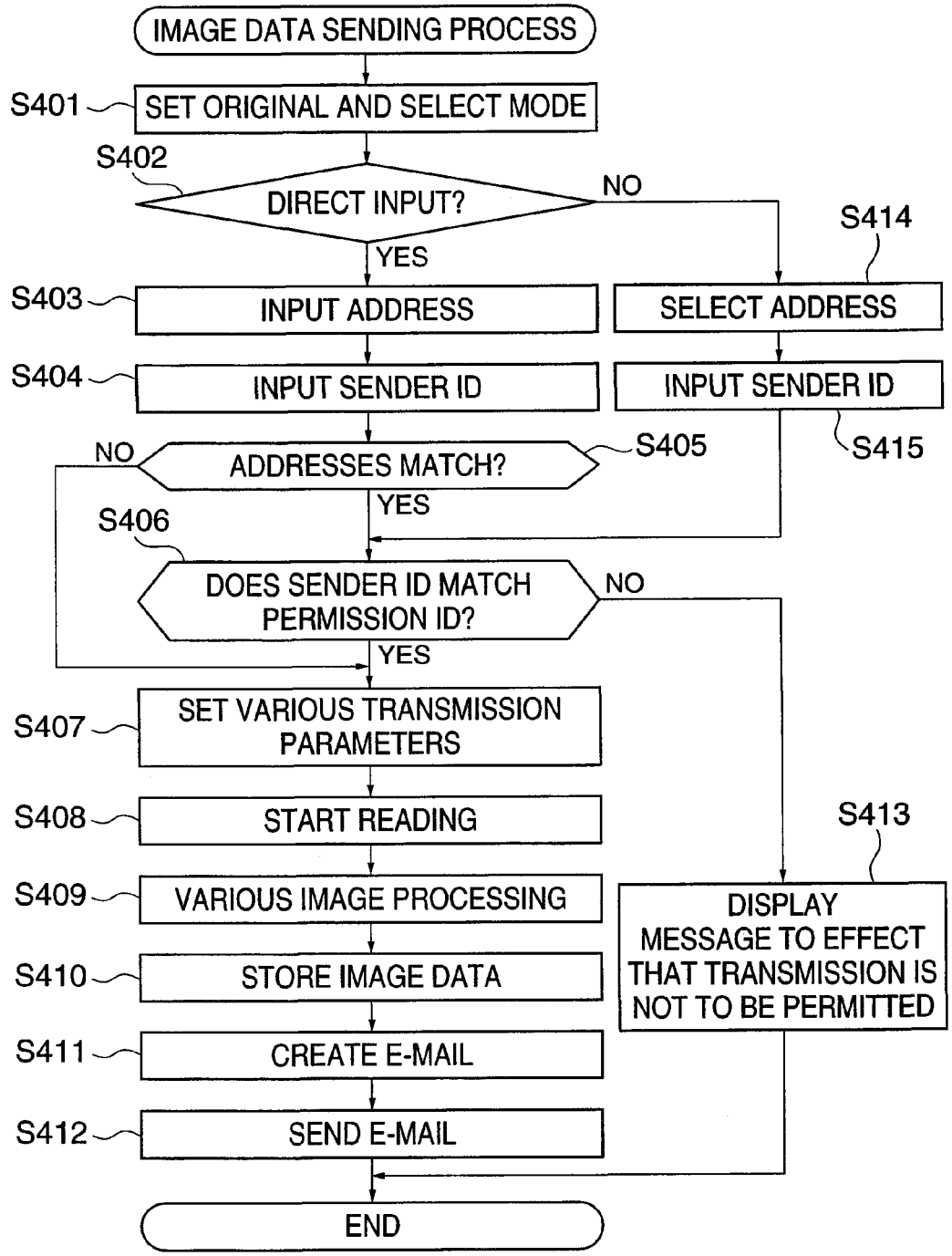
FIG. 5 is a flow chart showing an image data sending process carried out by the image input/output apparatus in FIG. 2.

FIG. 5 is a flow chart showing an image data sending process carried out by the image input/output apparatus 10 in FIG. 2.

In the process in FIG. 5, the sender attaches image data read by the scanner section 201 to an e-mail, designates a desired e-mail address, and sends the e-mail to the designated e-mail address by operating the operating section 210 of the image input/output apparatus 10.

Referring to FIG. 5, the sender sets an original 304 to be sent on the original tray 303 of the scanner section 201, and selects an image data sending function-related mode using the operating section 210 (step S401). Here, assuming that the sender selects an e-mail attachment mode, a message that prompts the sender to select the method of inputting an e-mail address is displayed in the display section of the operating section 210. In accordance with the message, the sender selects at least one of the two methods: the method in which a destination's e-mail address is directly input, and the method in which at least one e-mail address is selected from the list of destination's e-mail addresses stored in advance in the address storage section 501.

Then, the address storage section 501 determines whether or not the sender has selected the method in which a destination's e-mail address is directly input (step S402). If it is determined in the step S402 that the sender has selected the method in which a destination's e-mail address is directly input, the sender inputs a destination's e-mail address to the address storage section 501 using the operating section 210 (step S403) and inputs a sender ID to the permission ID collating section 503 (step S404).

Then, the address storage section 501 determines whether or not the destination's e-mail address input in the step S403 matches an e-mail address stored in advance (step S405).

If it is determined in the step S405 that the input destination's e-mail address matches an e-mail address stored in advance, the address storage section 501 sends the input destination's e-mail address to the permission ID storage section 502. The permission ID storage section 502 sends a permission ID associated with the e-mail address to the permission ID collating section 503. The permission ID collating section 503 determines whether or not the input sender ID matches the permission ID sent from the permission ID storage section 502 (step S406).

If it is determined in the step S406 that the input sender ID matches the permission ID sent from the permission ID storage section 502, a message to the effect that the sender is permitted to send image data to the destination's e-mail address input by the sender is displayed on the display of the operating section 210. At this time, the sender sets various transmission parameters such as the resolution of image data to be sent, which is required for transmission of the image data, and color/monochrome switching (step S407). On this occasion, the sender may add a fixed phrase prepared in advance and/or a comment input using the operating section 210 to the image data.

When a start key provided in the operating section 210 is pressed, the scanner section 201 starts reading the image data (step S408). Next, the image-inputting image processing section 210 of the control unit 200 performs predetermined image processing for image input on the image data read in the step S408, and then, the image-edition image processing section 220 performs image processing suitable for e-mail transmission (step S409).

Then, the image data on which the various image processing has been performed is stored in a predetermined file format such as JPEG, BMP, PDF, or SVG format in the HDD 208 (step S410). Then, in accordance with an existing universal e-mail format, an e-mail which is to be sent to the destination's e-mail address input by the sender is created, and the image data stored in the HDD 208 in the step S410 is attached to the created e-mail (step S411).

The e-mail thus created is sent to the e-mail client 30 of the destination via the e-mail server 20 using an e-mail sending function of the image input/output apparatus 10 (step S412), followed by termination of the process.

If it is determined in the step S406 that the input sender ID does not match the permission ID sent from the permission ID storage section 502, a message to the effect that the sender is not permitted to send image data to the destination's e-mail address input by the sender is displayed on the display of the operating section 210 (step S413), followed by termination of the process. In this case, the sender cannot continue an operation of sending image data to the destination's e-mail address input by the sender. Specifically, it may be configured such that an image data sending function-related screen is not displayed. Alternatively, a screen for inputting an administrator code and a division code required for operating the image input/output apparatus 10 may be displayed again. Also, it may be configured such that the start key for starting reading image data is locked.

If it is determined in the step S402 that the sender has selected the method in which an e-mail address is selected from the list of destination's e-mail addresses stored in advance in the address storage section 501 (NO to the step S402), the process proceeds to a step S414.

In the step S414, the address storage section 501 displays the list of destination's e-mail addresses stored in advance on the display of the operating section 210, and the sender selects a desired destination's e-mail address from the list of the displayed destination's e-mail addresses using the operating section 210. Then, a sender ID is input to the permission ID collating section 503 (step S415), and the step S406 and the subsequent steps are executed, followed by termination of the process.

If it is determined in the step S405 that the input destination's e-mail address does not match any e-mail address stored in advance, the sender is permitted to send image data, and the step S407 and the subsequent steps are executed, followed by termination of the process.

It may be configured such that when the input destination's e-mail address does not match any e-mail address stored in advance, the sender is not permitted to send image data, or it may be configured such that a setting is made in advance as to whether or not the sender is to be permitted to send image data.

According to the process in FIG. 5, if the sender ID input in the step S403 or S415 does not match the permission ID sent from the permission ID storage section 502 (NO to the step S406), the message to the effect that the sender is not permitted to send image data to the destination's e-mail address input by the sender is displayed on the display of the operating section 210 (step S413). Therefore, reception of undesired data by a destination can be prevented without increasing the load on a network, etc.

Although in the present embodiment, the sender inputs a destination's e-mail address (steps S403 and S414) first and then inputs a sender ID (steps S404 and S415), it may be configured such that the sender inputs a sender ID first and then an e-mail address. In this case, a sender ID is input first, and then as a method to input an e-mail address, one is selected from the two methods: the method in which a destination's e-mail address is directly input, or the method in which at least one e-mail address is selected from the list of destinations' e-mail addresses.

It may be configured such that in the case where the method in which at least one e-mail address is selected form the list of destinations' e-mail addresses is selected, all the e-mail addresses stored in the address storage section 501 are not displayed on the display section 210, but only e-mail addresses for which the sender ID input first is set as a permission ID are displayed on the display of the operating section 210, and a desired destination's e-mail address is selected from the displayed e-mail addresses. Therefore, only destinations to which image data can be sent are displayed, which improves convenience for the sender to designate a destination.

Although in the present embodiment, if as a result of collation of a sender ID input by the sender, it is determined that the sender is not permitted to send image data to a destination's e-mail address input by the sender (NO to the step S406, and S413), the sender cannot send image data to the destination's e-mail address input by the sender, the present invention is not limited to this, but convenience for users can be further improved by other configurations described below.

Also, it may be configured such that if as a result of collation of the sender ID input by the sender, it is determined that the sender is not permitted to send image data (NO to the step S406), image data that could not be sent is stored in the HDD 208 or the like, and positional information indicative of the storage location of the image data is sent to the destination's e-mail address. Specifically, the image data is stored in the HDD 208 of the image input/output apparatus 10, or in a storage device, not shown, on the LAN 40 or the Internet/Intranet 60, and positional information indicative of the storage location of the image data is sent to the destination's e-mail address. The positional information is indicative of a location on a network such as a URL, an IP address, a server name, a folder name, or a path stored in the storage device.

Upon receiving the positional information, a recipient accesses the storage location of the image data according to the positional information to obtain the image data. As a result, even in the case where the sender ID of the sender is not set as a permission ID with respect to a destination's e-mail address, the sender can notify the recipient of the presence of image data, and the image data itself is not sent to the recipient. Therefore, the recipient can obtain the image data as the need arises without overloading the network and the client PC.

Also, it may be configured such that a thumbnail of image data (i.e. image data is reduced in size to such an extent that the outline of the image data can be recognized) is sent to a destination's e-mail address. Therefore, the recipient can efficiently determine whether or not image data is necessary by referring to the thumbnail.

Further, it may be configured such that even in the case where as a result of collation of a sender ID, it is determined that the sender is not permitted to send image data (NO to the step S406), the image data can be sent insofar as the amount of the image data to be sent is not greater than a predetermined value. In this case, the CPU 205 determines whether or not the amount of the image data is not greater than the predetermined value. For example, it may be configured such that if the amount of the image data is 500K or less, senders other than the sender whose sender ID matches the permission ID can send the image data, and if the amount of the image data is greater than 500K, only the sender whose sender ID matches the permission ID can send the image data. Also, the amount of image data that can be sent may be individually set with respect to respective destination's e-mail addresses. This further improves convenience for users.

Also, it may be configured such that even in the case where as a result of collation of a sender ID, it is determined that the sender is not permitted to send image data (NO to the step S406), image data can be sent insofar as the present time is within a predetermined period of time after the determination. In this case, the CPU 205 is provided with a timing section, not shown, that times the present time, for determining whether the present time is within the predetermined period of time. For example, even senders other than the sender whose sender ID matches the permission ID can send the image data from 8:30 to 17:00, and other than that, only the sender whose sender ID matches the permission ID can send the image data. This further improves convenience for users.

Data sending levels may be set in advance to respective sender IDs, so that even in the case where as a result of collation of a sender ID, it is determined that the sender is not permitted to send image data (NO to the step S406), the sender can send the image data to the destination's e-mail address insofar as the input sender ID is a sender ID to which a data sending level not less than a predetermined value is set. In this case, the CPU 205 and the collating section 221 set a data sending level in association with a sender ID in response to an input from the operating section 210, and the collating section 221 determines whether or not the set data sending level is not less than the predetermined value. This further improves convenience for users.

Even in the case where as a result of collation of a sender ID, it may be determined that the sender is not permitted to send image data (NO to the step S406), the sender can send the image data according to whether or not a predetermined image is included in the image data. For example, it is configured such that if the image data includes a mark, a sign, a digital watermark, a pattern, or the like, the sender can send the image data. Specifically, the image data including the predetermined image mentioned above is used for a special purpose in many cases, and it seems that not everyone has such image data, and hence even senders other than senders who have been permitted to send image data in advance are permitted to send such image data. In this case, the template of the predetermined image is registered in advance in the HDD 208 or the like, and the CPU 205 determines whether or not image data to be sent includes the predetermined image. This improves convenience for users.

It may be configured such that the CPU 205 parses text obtained by performing known OCR processing on image data, and even in the case where as a result of collation of a sender ID, it is determined that the sender is not permitted to send the image data (NO to the step S406), the sender can send the image data insofar as the text includes a specific keyword. Conversely, it may be configured such that if the text includes a specific keyword, the sender is inhibited from sending the image data. Specifically, in the case where the text includes a keyword which is used for a specific purpose, it is considered that the image data is unlikely to be unnecessary, and hence even senders other than senders who have been permitted in advance to send image data are permitted to send the image data. Conversely, in the case where text in image data includes a keyword that is not desired by the recipient, the recipient does not have to receive the image data and hence the transmission of the image data is inhibited. In this case, keywords permitted to be sent or keywords inhibited from being sent are registered in the HDD 208 or the like, and the CPU 205 determines whether or not text obtained by performing the OCR processing on image data to be sent includes the specific keyword. This further improves convenience for users.

It may be configured such that image data to be sent is analyzed using an image analyzing technique of analyzing image data to determine whether the image data includes predetermined characteristics, and even in the case where as a result of collation of a sender ID, it is determined that the sender is not permitted to send the image data (NO to the step S406), the sender can send the image data depending on the image analysis result. For example, characteristics such as formats of a ledger sheet or the like and the layout of an image are registered in advance in the HDD 208 or the like, and if image data to be sent is based upon the registered format or layout, even senders other than senders who have been permitted in advance to send image data are permitted to send the image data. In this case, the CPU 205 determines whether or not the image data to be sent includes the predetermined characteristics. The image analyzing technique is executed by the image-edition image processing section 220 and the CPU 205. This further improves convenience for users.

It may be configured such that the sender is permitted to send the image data without collating his/her sender ID, provided that one or more of the following conditions are fulfilled.

1) The amount of the image data to be sent is not greater than a predetermined value;
2) The amount of the image data to be sent is not greater than a predetermined value;
3) The present time that has elapsed is within a predetermined period of time after the determination;
4) The input sender ID is a sender ID to which a data sending level not less than a predetermined value is set;
5) Image data to be sent includes a predetermined image;
6) Text in image data to be sent includes a specific keyword; and
7) The result of image data analysis satisfies predetermined conditions.

In this case, it may be configured such that if the image data cannot be sent, the sender ID is collated, and the sender is permitted to send the image data.

Although in the present embodiment, image data read by the scanner section 201 is sent to a destination's e-mail address, the present invention is not limited to this, but image data to be sent may be print data sent from a client PC or the like, image data shot and input by a digital camera, image data stored in the HDD 208, or the like insofar as it can be handled by the image input/output apparatus 10.

Although in the present embodiment, an e-mail with image data attached thereto is sent to an e-mail client, the present invention is not limited to this, but an e-mail with image data attached thereto may be sent to any device or application such as a PC, a PDA, a cellular phone, a car navigation system, or the like insofar as it is capable of sending and receiving e-mails.

Although in the present embodiment, image data is sent as an e-mail attachment, the present invention is not limited to this, but image data may be sent via a communication means such as a facsimile, a network, a public line, infrared communication, radio, or Bluetooth.

The type of data to be sent in not limited to image data, and the format of data to be sent is not limited to the above-mentioned ones.

Although the data communication apparatus according to the present embodiment is implemented by the image input/output apparatus 10 as a multi-function peripheral, the present invention is not limited to this, but the data communication apparatus according to the present invention may be implemented by a scanner alone, or a device capable of inputting or storing image data shot by a digital camera or the like.

Although in the present embodiment, the collating section 221 of the control unit 200 in the image input/output apparatus 10 includes the address storage section 501, the permission ID storage section 502, and the permission ID collating section 503, an address management server may be constructed on the LAN 40 or the Internet/Intranet 60, for managing e-mail addresses and permission IDs, or that a plurality of image input/output apparatuses are connected to each other via the LAN 40 or the Internet/Intranet 60. With this arrangement, a plurality of image input/output apparatuses can share e-mail addresses, permission IDs, and so forth.

Although in the present embodiment, a sender ID or a password is input via the operating section 210, the present invention is not limited to this, but the sender may be identified by inserting a card in which a sender ID is stored or by biometrics such as fingerprint authentication. This improves convenience for users to input senders ID.

Figure 6:
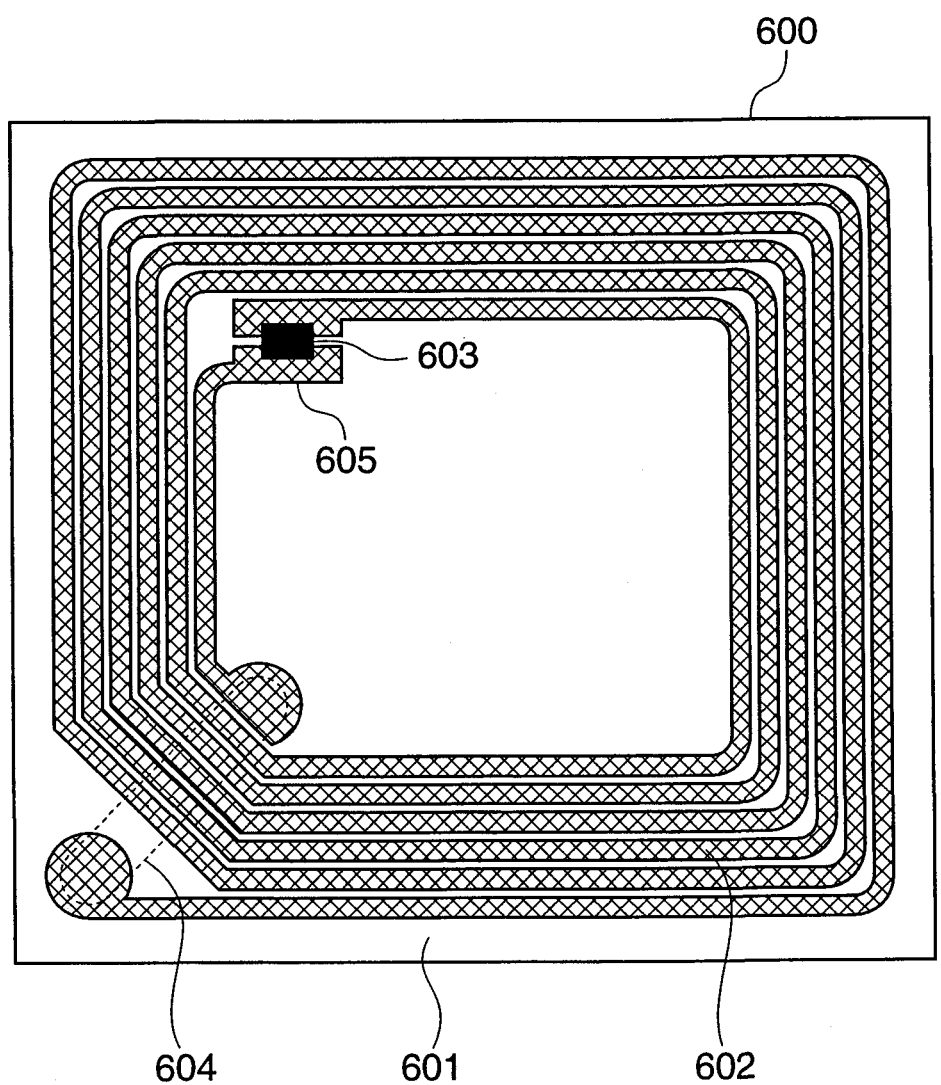
FIG. 6 is a view showing the construction of a noncontact IC tag.

Alternatively, it may be configured such that a sender ID is recorded in a RFID using a noncontact IC tag as shown in FIG. 6, and the sender ID is read out using an IC reader/writer 800, described later, so that the sender ID can be input to the permission ID collating section 503.

Referring to FIG. 6, a noncontact IC tag 600 is constructed such that an antenna pattern 602 is formed on one side surface of a substrate made of plastic or the like, and the antenna pattern 602 and a capacitor incorporated in an IC chip 603 that stores data shown in FIG. 7, described later, form a resonance circuit. The resonance circuit is energized by a radio wave of a given frequency received from the IC reader/writer 800 as a radio wave source, shown in FIG. 8, described later, to send information stored in the IC chip 603 to the IC reader/writer 800.

The antenna pattern 602 is in the form of a coil, and a conducting member 604 forms a jumping circuit on the other or reverse side surface of the substrate 601. The antenna pattern 602 is connected to a bump or a pad on the reverse side surface of the IC chip 603 via a coil connecting element 605. The noncontact IC tag 600 constructed as above has the coil-shaped antenna pattern 602 formed by photo-etching or post resist print etching of a metallic foil such as an aluminum foil laminated on the substrate 601 and attaching the IC chip 603 to the substrate 601. No particular limitations are imposed upon the shape and dimension of the noncontact IC tag 600 insofar as it is 20 mm square or less in size.

Figure 7:
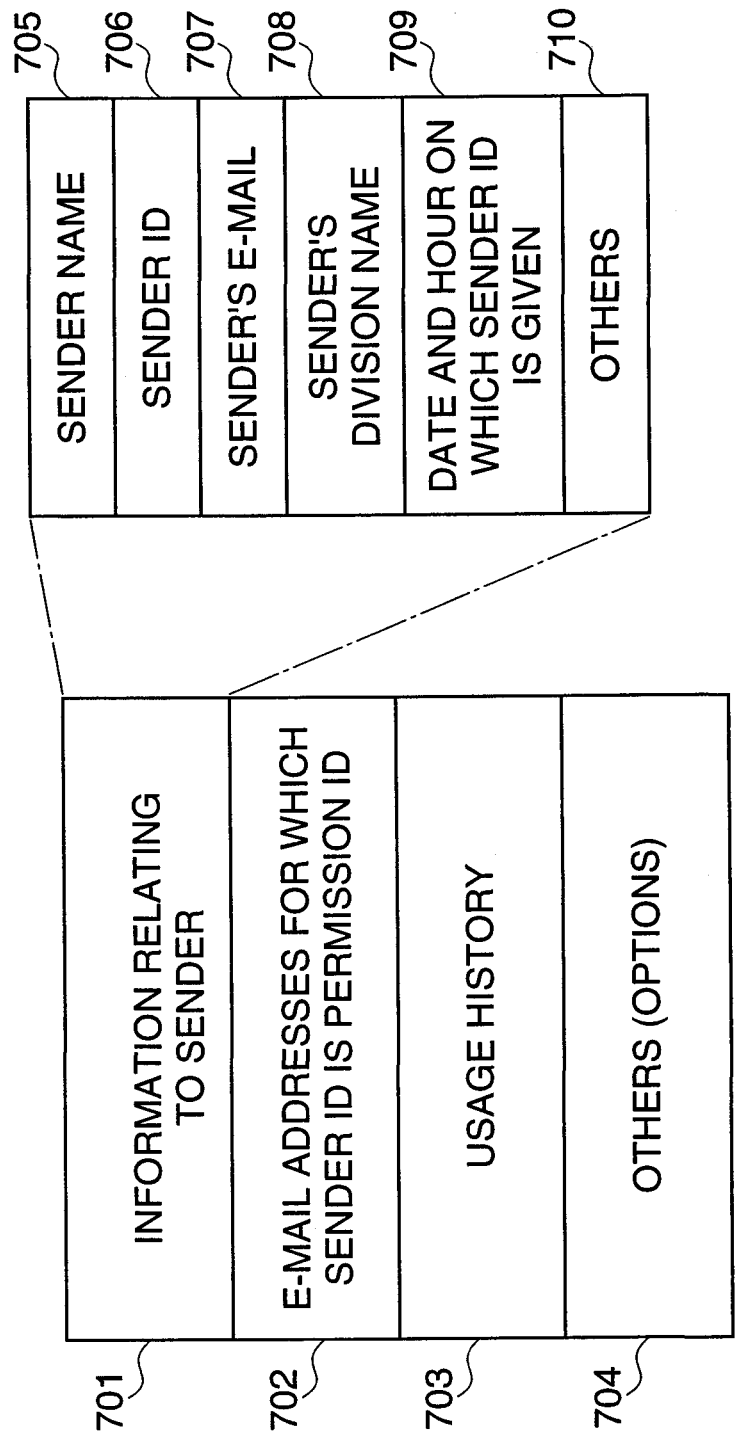
FIG. 7 is a view showing an example of data that is stored in the noncontact IC tag in FIG. 6.

FIG. 7 is a diagram showing an example of data stored in the noncontact IC tag 600 in FIG. 6.

As shown in FIG. 7, the noncontact IC tag 600 mainly stores four pieces of information: sender-related information 701, one or more e-mail addresses 702 for which a sender ID is set as a permission ID, a usage history 703, and others (options) 704. These four pieces of information are only illustrative; other various information may be stored in the noncontact IC tag 600 insofar as the storage capacity of the noncontact IC tag 600 permits.

The sender-related information 701 includes, for example, a sender name 705, a sender ID 706, a sender's e-mail address 707, a sender's division name 707, a date and hour 709 on which a sender ID is given, and others 710.

The e-mail addresses 702 for which the sender ID is set a permission ID are associated with the sender ID included in the sender-related information 701, and to which e-mail transmission is permitted.

The usage history 703 is information that is indicative of a history in which collation of IDs and transmission have been carried out using the noncontact IC tag 600.

The others (options) 704 are various information that are not included in the above-mentioned three categories.

FIG. 7 is only illustrative, and the noncontact IC tag 600 may include other information, and the above described information should not necessarily be included in the noncontact IC tag 600.

Figure 8:
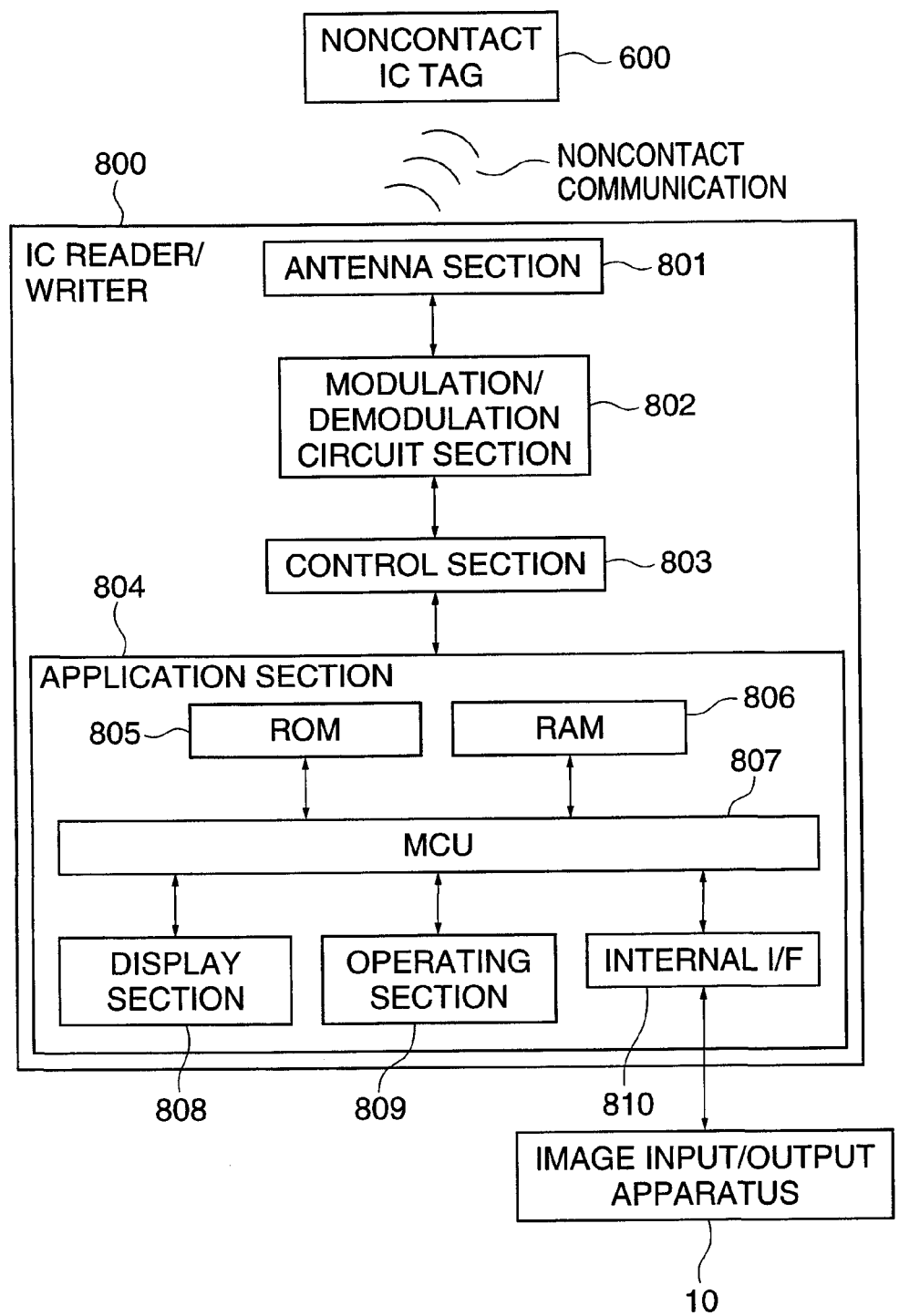
FIG. 8 is a block diagram showing the internal construction of an IC reader/writer that communicates with the noncontact IC tag in FIG. 6.

FIG. 8 is a block diagram showing the internal construction of the IC reader/writer 800 that communicates with the noncontact IC tag 600 in FIG. 6.

The IC reader/writer 800 is incorporated in the image input/output apparatus 10, or is externally connected to the image input/output apparatus 10. It is assumed here that the IC reader/writer 800 is externally connected to the image input/output apparatus 10.

As shown in FIG. 8, the IC reader/writer 800 is comprised of an antenna section 801 that carries out noncontact communication with the noncontact IC tag 600, a modulation/demodulation circuit section 802 that converts data sent and received via the antenna section 801, a control section 803, and an application section 804.

In reading data from the noncontact IC tag 600, the modulation/demodulation circuit section 802 converts data received via the antennal section 801 into data that can be used by the image input/output apparatus 10. On the other hand, in writing data into the noncontact IC tag 600, the modulation/demodulation circuit section 802 converts data received from the image input/output apparatus 10 into data that can be sent via the antenna section 801.

The control section 803 is implemented by a microcomputer or a dedicated control circuit, and it controls the application section 804, described later.

The application section 804 is comprised of a micro controller unit (MCU) 807 that controls component elements of the application section 804, a ROM (Read Only Memory) 805, a SRAM 806 that is readable and writable, a display section 808 that displays various information, an operating section 809 for the user to operate the IC reader/writer 800, and an external interface 810 that is connected to the image input/output apparatus 10. The ROM 805, the SRAM 806, the display section 808, the operating section 809, and the external interface 810 are connected to the MCU 807.

With the above arrangement, the application section 804 can analyze data received from the noncontact IC tag 600 and displays information on the display section 808. Also, responsive to user's operation of the operating section 809, the application section 804 carries out editing or the like of received data. In sending data to the noncontact IC tag 600, the application section 804 displays data to be sent on the display section 808, and responsive to user's operation of the operating section 809, the application section 804 performs predetermined processing on the data to be sent and then sends the data.

As a result, the IC reader/writer 800 alone is able to display/edit data sent to/received from the noncontact IC tag 600. Also, the IC reader/writer 800 can display/edit data sent to/received from the image input/output apparatus 10 by way of the external interface 810.

In the case where the IC reader/writer 800 is incorporated in the image input/output apparatus 10, equivalent modules in the image input/output apparatus 10 may be used in place of the ROM 805, the RAM 806, the MCU 807, the display section 808, and the operating section 809.

Figure 9:
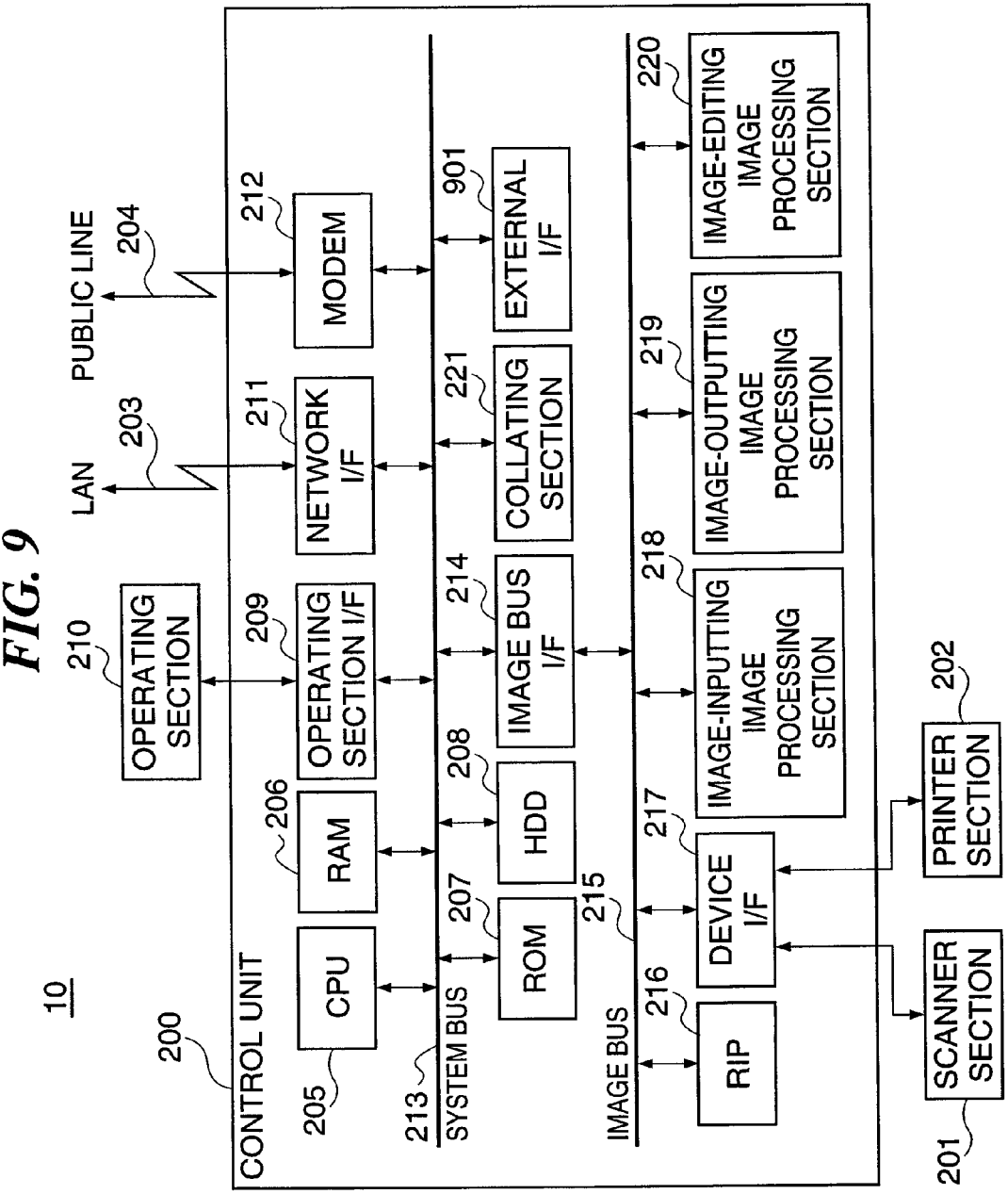
FIG. 9 is a block diagram showing the internal construction of an image input/output apparatus to which the IC reader/writer in FIG. 8 is connected.

FIG. 9 is a block diagram showing the internal construction of the image input/output apparatus 10 to which the IC reader/writer 800 is connected.

The construction shown in FIG. 9 is basically the same as the construction shown in FIG. 2. Therefore, elements and parts corresponding to those of the image input/output apparatus 10 in FIG. 2 are denoted by the same reference numerals with description thereof omitted, and a description will be given below only of a difference between the image input/output apparatus 10 in FIG. 9 and the image input/output apparatus 10 in FIG. 2. The image input/output apparatus 10 in FIG. 9 differs from the image input/output apparatus 10 in FIG. 2 only in that an external I/F 901 intended for connection to the IC reader/writer 800 is connected to the system bus 213.

Figure 10:
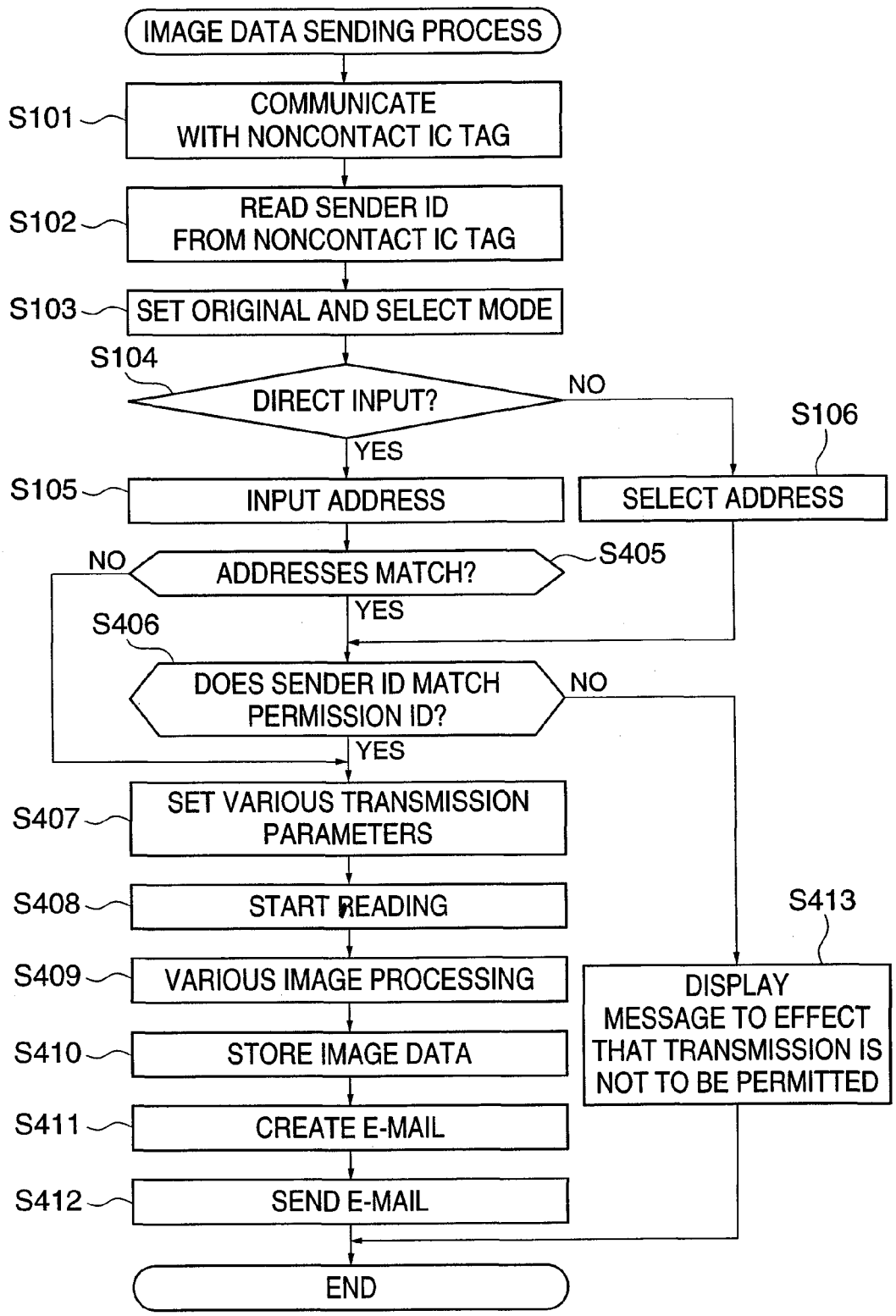
FIG. 10 is a flow chart showing an image data sending process carried out by the image input/output apparatus in FIG. 9.

FIG. 10 is a flow chart showing an image data sending process carried out by the image input/output apparatus 10 in FIG. 9.

The process in FIG. 10 is basically the same as the process in FIG. 5. Therefore, steps corresponding to those in FIG. 5 are denoted by the same reference numerals with description thereof omitted, and a description will be given below only of differences between the process in FIG. 10 and the process in FIG. 5.

The process in FIG. 10 differs from the process in FIG. 5 only in that steps S101 to S106 are provided in place of the steps S401 to S404.

Referring to FIG. 10, when a sender who carries the noncontact IC tag 600 comes close to the image input/output apparatus 10, the IC reader/writer 800 connected to the image input/output apparatus 10 communicates with the noncontact IC tag 600 (step S101). Then, the image input/output apparatus 10 automatically reads a sender ID stored in the noncontact IC tag 600 (step S102).

Then, the sender sets an original 304 to be sent on the original tray 303 of the scanner section 201 and selects an image data sending function-related mode using the operating section 210 (step S103). Here, taking an example where the sender selects an e-mail attachment mode, a message that prompts the sender to select the method of inputting an e-mail address is displayed on the display of the operating section 210. In accordance with the message, the sender selects one of the two methods: the method in which a destination's e-mail address is directly input, and the method in which at least one e-mail address is selected from the list of destination's e-mail addresses stored in advance in the address storage section 501.

Then, the address storage section 501 determines whether or not the sender has selected the method in which a destination's e-mail address is directly input (step S104). If it is determined that the sender has selected the method in which a destination's e-mail address is directly input, a destination's e-mail address is input to the address storage section 501 by the sender using the operating section 210 (step S105), and the steps S405 and the subsequent steps are executed, followed by termination of the process.

If it is determined in the step S104 that the sender has selected the method in which at least one e-mail address is selected from the list of destination's e-mail addresses stored in advance in the address storage section 501, the address storage section 501 displays the list of destination's e-mail addresses stored in advance in the address storage section 501 on the display of the operating section 210. On this occasion, since the image input/output apparatus 10 has already acquired the sender ID from the noncontact IC tag 600, only e-mail addresses for which the sender ID may be set as a permission ID are displayed.

Then, the sender selects at least one desired e-mail address from the displayed list of destination's e-mail addresses using the operating section 210 (step S106), and the steps S406 and the subsequent steps are executed, followed by termination of the process.

According to the process in FIG. 10, the IC reader/writer 800 connected to the image input/output apparatus 10 communicates with the noncontact IC tag 600 (step S101), and the image input/output apparatus 10 automatically reads a sender ID stored in the noncontact IC tag 600 (step S102). Therefore, the usage of the noncontact IC tag 600 improves convenience in authenticating the sender by means of a sender ID.

Alternatively, predetermined information may be stored in advance in a very small and thin noncontact IC tag, and this noncontact IC tag may be attached to or "plowed" or embedded in an original to be read by the scanner section 201. The predetermined information stored in the noncontact IC tag is set in advance in the collating section 221 or the like. It may be configured such that when the original is being read by the scanner section 201, the IC reader/writer 800 reads out the information stored in the noncontact IC tag attached to or "plowed" or embedded in the original, and when the readout information matches the predetermined information set in advance in the collating section 221 or the like, transmission of image data obtained from the original read by the scanner section 201 is permitted. The predetermined information stored in the noncontact IC tag may be set in the collating section 221 or the like with respect to each destination's e-mail address.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A data communication apparatus comprising:
   a scanning unit configured to scan an original to obtain image data corresponding to the original;
   a transmitting unit configured to transmit the image data obtained by the scanning unit;
   a storage unit configured to store an address storage section in which addresses are registered, each of the addresses corresponding to an ID;
   an accepting unit configured to accept an ID from a user who uses the data communication apparatus; and
   a control unit configured to select, for operating the data communication apparatus, a first mode or a second mode based on instruction of the user of which the ID has been accepted by the accepting unit, the first mode in which an address selected by the user from the address storage section is determined as a transmission destination of the image data, and the second mode in which characters input by the user, instead of the user selecting from the address storage section, are determined as a transmission destination of the image data,
   wherein the control unit is configured to, in a case where the first mode is selected for operating the data communication apparatus, permit the image data to be transmitted to the address selected by the user from the address storage section if the address selected by the user from the address storage section corresponds to the ID accepted by the accepting unit, and restrict the image data from being transmitted to the address selected by the user from the address storage section if the address selected by the user from the address storage section does not correspond to the ID accepted by the accepting unit, and
   wherein the control unit is configured to, in a case where the second mode is selected for operating the data communication apparatus, permit, if the characters input by the user are registered in the address storage section as one address which corresponds to the ID accepted by the accepting unit, the image data to be transmitted to the one address, and restrict, if the characters input by the user are registered in the address storage section as a particular address which does not correspond to the ID accepted by the accepting unit, the image data from being transmitted to the particular address.

2. A data communication apparatus according to claim 1, further comprising a display unit configured to display at least one address of the addresses registered in the address storage section stored in the storage unit, the at least one address corresponding to the ID accepted by the accepting unit,
   wherein the display unit does not display an address which does not correspond to the ID accepted by the accepting unit.

3. A data communication apparatus according to claim 1, wherein an address of the addresses registered in the address storage section stored in the storage unit is an E-mail address.

4. A data communication apparatus according to claim 1, wherein the characters input by the user include alphabetic characters, symbols, or both alphabetic characters and symbols, input one at a time.

5. A data communication apparatus according to claim 1, wherein the accepting unit is an IC card reader.

6. A data communication method comprising the steps of:
   scanning an original to obtain image data corresponding to the original;
   storing an address storage section in which addresses are registered, each of the addresses corresponding to an ID;
   accepting an ID from a user who uses a data communication apparatus; and
   controlling to select, for operating the data communication apparatus, a first mode or a second mode based on instruction of the user of which the ID has been accepted in the accepting step, the first mode in which an address selected by the user from the address storage section is determined as a transmission destination of the image data, and the second mode in which characters input by the user, instead of the user selecting from the address storage section, are determined as a transmission destination of the image data,
   wherein the controlling step comprises, in a case where the first mode is selected for operating the data communication apparatus, permitting the image data to be transmitted to the address selected by the user from the address storage section if the address selected by the user from the address storage section corresponds to the ID accepted in the accepting step, and restricting the image data from being transmitted to the address selected by the user from the address storage section if the address selected by the user from the address storage section does not correspond to the ID accepted in the accepting step, and
   wherein the controlling step comprises, in a case where the second mode is selected for operating the data communication apparatus, permitting, if the characters input by the user are registered in the address storage section as one address which corresponds to the ID accepted in the accepting step, the image data to be transmitted to the one address, and restricting, if the characters input by the user are registered in the address storage section as a particular address which does not correspond to the ID accepted in the accepting step, the image data from being transmitted to the particular address.

7. A non-transitory computer-readable storage medium storing a computer-executable data communication program, the program comprising:
   scanning instructions configured to scan an original to obtain image data corresponding to the original;
   storing instructions configured to store an address storage section in which addresses are registered, each of the addresses corresponding to an ID;
   accepting instructions configured to accept an ID from a user who uses a data communication apparatus; and
   controlling instructions configured to select, for operating the data communication apparatus, a first mode or a second mode based on instruction of the user of which the ID has been accepted according to the accepting instructions, the first mode in which an address selected by the user from the address storage section is determined as a transmission destination of the image data, and the second mode in which characters input by the user, instead of the user selecting from the address storage section, are determined as a transmission destination of the image data, wherein the controlling instructions are configured to, in a case where the first mode is selected for operating the data communication apparatus, permit the image data to be transmitted to the address selected by the user from the address storage section if the address selected by the user from the address storage section corresponds to the ID accepted according to the accepting instructions, and restrict the image data from being transmitted to the address selected by the user from the address storage section if the address selected by the user from the address storage section does not correspond to the ID accepted according to the accepting instructions, and wherein the controlling instructions are configured to, in a case where the second mode is selected for operating the data communication apparatus, permit, if the characters input by the user are registered in the address storage section as one address which corresponds to the ID accepted according to the accepting instructions, the image data to be transmitted to the one address, and restrict, if the characters input by the user are registered in the address storage section as a particular address which does not correspond to the ID accepted according to the accepting instructions, the image data from being transmitted to the particular address.

* * * * *